Jan. 10, 1956 K. ONANIAN 2,730,317
PARACHUTE DECELERATION DEVICE
Filed Jan. 20, 1955 2 Sheets-Sheet 1
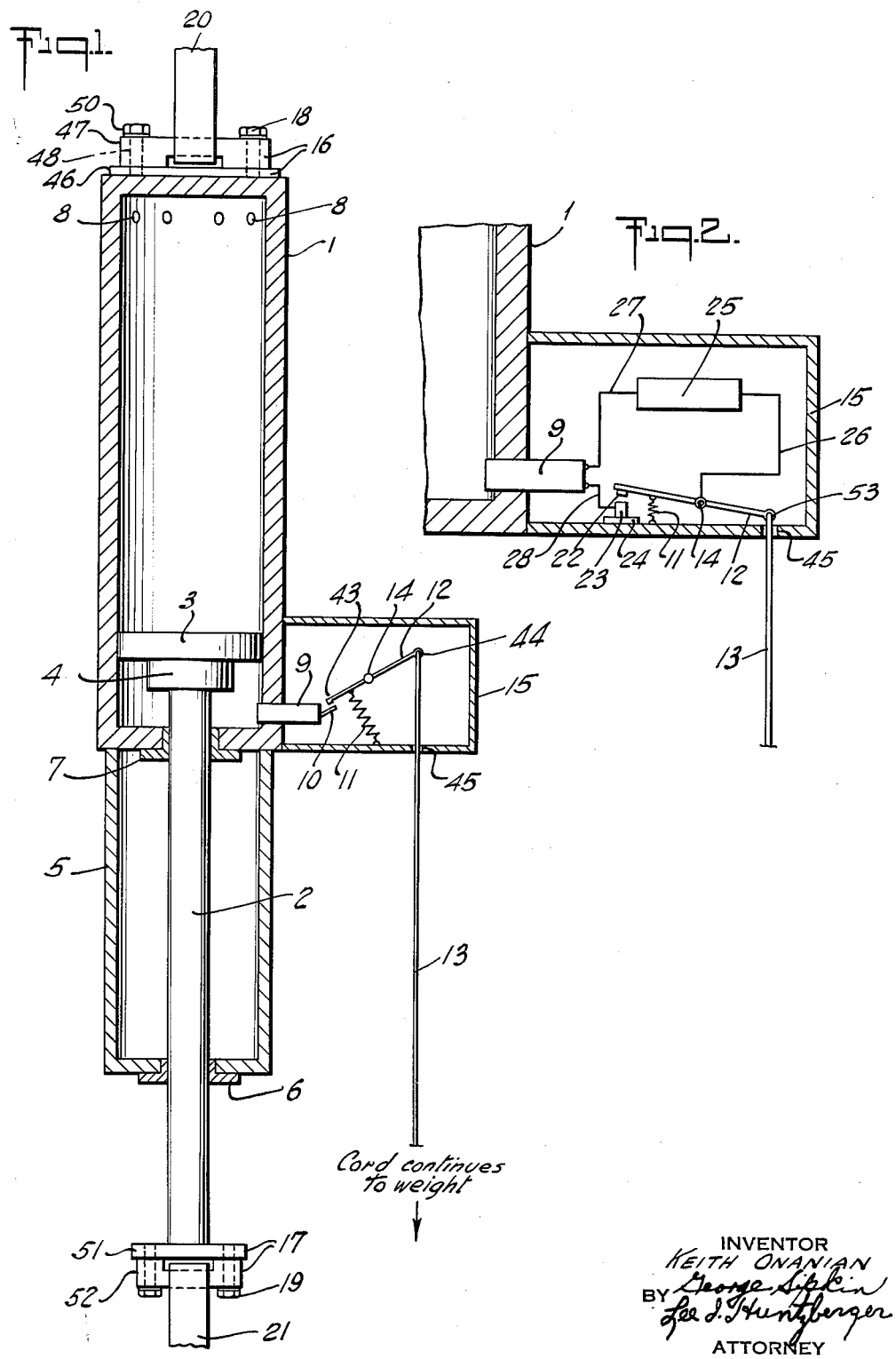
INVENTOR
KEITH ONANIAN
ATTORNEY Jan. 10, 1956 K. ONANIAN 2,730,317
PARACHUTE DECELERATION DEVICE
Filed Jan. 20, 1955 2 Sheets-Sheet 2

INVENTOR
KEITH ONANIAN.
BY George Lipkin
Lee J. Huntzberger
ATTORNEY

United States Patent Office 2,730,317
Patented Jan. 10, 1956

2,730,317

PARACHUTE DECELERATION DEVICE

Keith Onanian, Cambridge, Mass.

Application January 20, 1955, Serial No. 483,184

6 Claims. (Cl. 244—152)

(Granted under Title 35, U. S. Code (1952), sec. 266)

The invention described herein may be manufactured and used by or for the Government of the United States of America for governmental purposes without the payment of any royalties thereon or therefor.

This invention concerns an improved deceleration device for use with parachutes.

Parachute deceleration devices of the prior art, of the same type as the device of the present invention, utilize explosives as their primary motive power source. The presence of explosives in the devices of the prior art make them potentially dangerous to parachutists near them and make them potentially destructive of nearby material or freight.

Triggering mechanisms of parachute deceleration devices of the prior art are complex and utilize many component parts. The great number of components in the triggering mechanisms of the devices of the prior art make them susceptible to operational failure or to premature operation.

Prior art parachute deceleration devices are comparatively heavy and bulky.

The principal object of this invention is the provision of anew and improved parachute deceleration device.

An object of this invention is the provision of an improved parachute deceleration device utilizing a relatively safe source of primary motive power.

An object of this invention is the provision of an improved parachute deceleration device employing a triggering mechanism which is simple in structure and of few component parts.

An object of this invention is the provision of an improved parachute deceleration device which is reliable in operation, of comparatively light weight and compact in structure.

Another object of this invention is the provision of an improved parachute deceleration device which is readily attached to or removed from standard type parachutes.

A further object of this invention is the provision of a system utilizing a plurality of new and improved parachute deceleration devices to control the descent of an object to the ground.

Other objects and many of the attendant advantages of this invention will be readily appreciated as the same becomes better understood by reference to the following detailed description when considered in connection with the accompanying drawings wherein:

Fig. 1 is a cross-sectional presentation of the new and improved parachute deceleration device of the present invention;

Fig. 2 is a sectional schematic presentation of a triggering mechanism for the parachute deceleration device of the present invention.

Fig. 1 is a cross-sectional presentation of the new and improved parachute deceleration device of the present invention.

Figure 3:
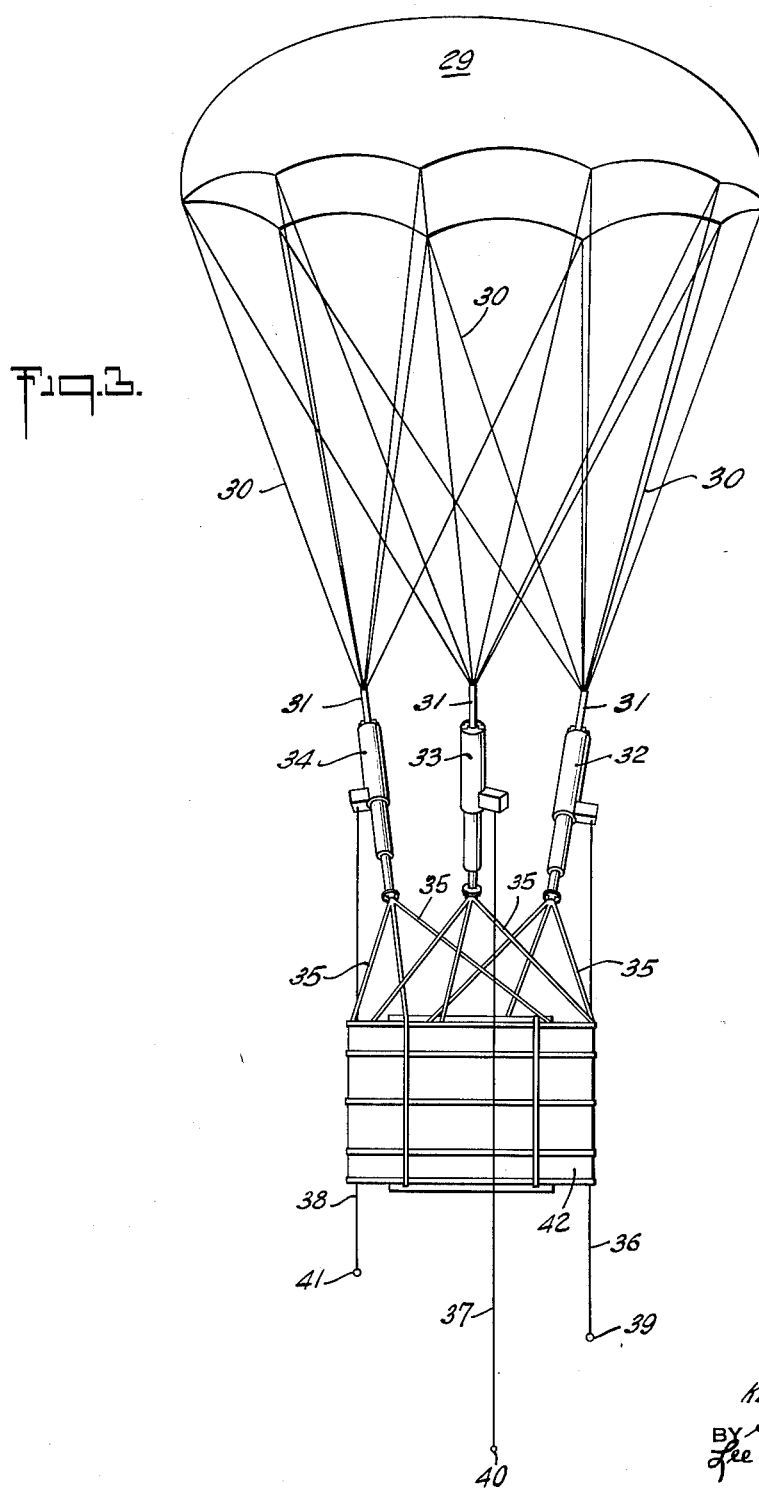
Fig. 3 is a perspective presentation of a parachute, descending with a load of freight, utilizing a plurality of new and improved parachute deceleration devices of the present invention.

The parachute deceleration device comprises a piston cylinder 1 in which a piston shaft 2 is adapted for lateral motion, in a manner known in the art. The piston head 3 is affixed to the piston shaft 2 through a piston head spacer 4. The piston head spacer 4 is of larger diameter than the piston shaft 2 and of smaller diameter than the piston head 3.

The upper bushing 7 and the lower bushing 6 support and align the piston shaft 2 in its travel in the piston cylinder 1 in a manner known in the art. The lower bushing 6 is supported in its proper position by the lower bushing support unit 5. The piston cylinder 1, the piston shaft 2, the piston head 3, the piston head spacer 4, the upper bushing 7, the lower bushing 6 and the lower bushing support unit 5 are commonly coaxially positioned. The lower bushing support unit 5 is, in the preferred embodiment of Fig. 1, of cylindrical shape and of smaller diameter than that of the piston cylinder 1. The lower bushing support unit 5 may, however, be of any type, shape, or diameter, as long as it supports the lower bushing 6 in coaxial position about the piston shaft 2 and in coaxial alignment with the upper bushing 7.

The ventilating holes 8 in the piston cylinder 1 permit the upward axial travel in the cylinder 1 of the piston shaft 2, by providing outlets for the pressure reduction of the air in the cylinder above the piston head 3.

The triggering mechanism housing 15 is affixed to the piston cylinder 1 and houses the high velocity gas capsule 9 and its triggering assembly. The triggering mechanism assembly comprises an arm 12, pivotally affixed to the triggering mechanism housing 15 by a pivot 14, which is positioned to contact the triggering pin 10 of the high velocity gas capsule 9 with a sufficient impact to initiate the operation of said capsule. The portion of the arm 12 closest to the triggering pin 10 is spring-loaded by a spring 11 which is affixed at one end to the triggering mechanism housing 15 and at the other end to the arm to constantly urge the contact point 43 of the arm toward contact with the triggering pin.

The portion of the arm 12 farthest from the triggering pin 10, on the other side of the pivot 14 from the contact point 43, is constantly urged downward by a weight (shown in Fig. 3) on a cord 13 affixed to the arm through the eye 44 in the arm. The cord-supported weight is selected to present a counterbalancing force on the arm 12 to that exerted by the spring 11, which is greater than the force exerted on the arm by the spring. The cord 13 passes freely through a hole 45 in the triggering mechanism housing 15 to permit the cord-supported weight (shown in Fig. 3) to hang unobstructed under the full influence of gravity.

The high velocity gas capsule 9 is fitted in a hole through the wall of the piston cylinder 1 in as close a fashion, to prevent the variation of pressure in the cylinder, as are the piston shaft 2 and the piston head 3. The gas extruding end of the high velocity gas capsule 9 is inside the cylinder wall. The high velocity gas capsule 9 may be fitted in a hole in the base of the piston cylinder 1 and it may be so positioned that its gas extruding end is flush with the inner surface of the cylinder wall or base.

The coupler 16 comprises a base plate 46 and a clamp plate 47. The base plate 46 has coupling screws 48, embedded in, or bolted to, it at its ends, so positioned that they extend perpendicularly from the base of the piston cylinder 1. The clamp plate 47 has holes 49, drilled through it and so positioned that they are coaxial with, and penetrated by, the perpendicularly extending coupling screws 48 of the base plate 46.

The base plate 46 of the coupler 16 is firmly affixed to, and integral with, the base of the piston cylinder 1.

The clamp plate 47 of the coupler 16 is designed to hold a strap 20 by being positioned through a loop in the strap 20 and then fitted over the coupling screws 48 of the base plate 46. The clamp plate 47, through the strap 20, is bolted to the base plate 46 by the bolts 50 on the projecting coupling screws 48 of the base plate. Although the clamp plate 47 shown is a single unit of varying thickness, a clamp plate of uniform thickness may be utilized if washers of sufficient thickness are placed on the coupling screws 48 between the base plate and the clamp plate, before the clamp plate is bolted to the base plate. The washers would, as does the lesser thickness of the single unit clamp plate 47, permit the holding of the strap 20 without chafing, rubbing or distorting such strap between the clamp plate and the base plate.

The strap 20 connects the base of the piston cylinder 1 to the shroud lines of the parachute (shown in Fig. 3).

The coupler 17 is identical to the coupler 16, except that the base plate 51 of the coupler 17 is formly affixed to, and integral with, the piston shaft 2. The clamp plate 52 is positioned through a loop in the strap 21 to support said strap without chafing, rubbing or distortion of said strap.

The strap 21 connects the piston shaft 2 of the piston cylinder to the material, freight or human load supported by the parachute.

The operation of the parachute deceleration device of Fig. 1 is as follows.

In their inoperative condition the component parts of the parachute deceleration device are in the positions shown in Fig. 1. The component parts maintain the positions shown in Fig. 1 during the descent of the parachute and its load.

The length of the cord 13 is predetermined to insure that the weight (shown in Fig. 3) supported by the cord will reach the earth at a predetermined time before the load reaches the earth. When the weight (shown in Fig. 3) supported by the cord 13 reaches the earth, or an object on the earth, the previously weighted taut cord becomes slack and removes the force, previously applied by the weight, from the eye 44 portion of the arm 12 of the triggering mechanism. The force applied to the contact point 43 portion of the arm 12 by the spring 11, which is less than that applied to the eye 44 portion of the arm by the weight on the cord 13, becomes the only force acting on the arm. The spring force pivots the arm 12 around its pivot 14 to bring the contact point 43 into contact with the triggering pin 10 with sufficient force to initiate the operation of the high velocity gas capsule 9.

The high velocity gas capsule 9, when its operation is initiated, releases a high velocity stream of gas under pressure into the piston cylinder 1 in the area under the piston head 3. The blast of high velocity gas under its piston head 3 has a pressure high enough to force the piston shaft 2 upward into the piston cylinder 1. The pressure above the piston head 3 in the piston cylinder is decreased as the piston shaft 2 travels axially in the cylinder 1 due to the escape of air from the cylinder via the ventilating holes 8.

When the piston shaft 2 is forced upward through the piston cylinder 1 it pulls the freight supported by the parachute (shown in Fig. 3) up with it, closer to the canopy of the paracrute and pulls the canopy of the parachute downward, closer to the freight. The upward pull on the freight and the downward pull on the parachute canopy are relative, the upward pull on the freight being more pronounced than the downward pull on the canopy. The downward pull on the canopy serves to increase the air resistance under the canopy so that the combined upward pull on the freight and the downward pull on the canopy cushion the landing impact of the freight.

Fig. 2 is a sectional schematic presentation of triggering mechanism for the parachute deceleration device of the present invention.

The triggering mechanism housing 15 is affixed to the piston cylinder 1 and houses the high velocity gas capsule 9 and its triggering mechanism assembly. The triggering mechanism assembly is similar to that shown in Fig. 1, except that it initiates the operation of the high velocity gas capsule 9 by electricity rather than by the mechanical means shown in Fig. 1. The triggering mechanism assembly comprises an arm 12, pivotally affixed to the triggering mechanism housing 15 by a pivot 14, which is positioned to contact the contact point 23 with the contact point 22 when the operation of the gas capsule is initiated. The portion of the arm 12 closest to the contact point 23 is spring-loaded by a spring 11 which is affixed at one end to the triggering mechanism housing 15 and at the other end to the arm to constantly urge the contact point 22 of the arm toward contact with the contact point 23. The contact point 22 is insulatedly affixed to the arm 12 and the contact point 23 is affixed to the triggering mechanism housing 15 through the insulating element 24.

The portion of the arm 12 fartherest from the contact point 22, on the other side of the pivot 14 from the contact point 22, is constantly urged downward by a weight (shown in Fig. 3) on a cord 13 affixed to the arm through the eye 53 in the arm. The cord-supported weight is selected to apply a counterbalancing force to the arm 12 to that exerted by the spring 11, which is greater than the force exerted on the arm by the spring. The cord 13 passes freely through a hole 45 in the triggering mechanism housing 15 to permit the cord-supported weight (shown in Fig. 3) to hang unobstructed under the full influence of gravity.

The high velocity gas capsule 9 is fitted in a hole through the wall of the piston cylinder 1 in a manner similar to that described in connection with Fig. 1.

One terminal of the electrically-initiated trigger of the high velocity gas capsule 9 is electrically connected through an electrical conductor 27 to a battery 25. The battery 25 is electrically connected through an electrical conductor 26 to the pivot 14. The pivot 14 is electrically connected to the contact point 22 by an electrical conductor supported by the arm 12. The contact point 23 is electrically connected to the other terminal of the electrically-initiated trigger of the high velocity gas capsule 9 by an electrical conductor 28.

The trigger mechanism shown in Fig. 2 operates in a manner similar to that of the triggering mechanism of Fig. 1 as described in connection with Fig. 1. The point of difference between the triggering mechanism of Figs. 1 and 2 is that when the only force applied to the arm 12 is that exerted by the spring 11, the contact point 22 of the arm contacts the contact point 23 affixed to the triggering mechanism housing 15 to close the electric circuit comprising the conductor 27, the battery 25, the conductor 26, the conductor supported by the arm from the pivot to the contact point 22 and the conductor 28. The closing of the circuit causes the application of the battery output to the electrically-initiated trigger of the high velocity gas capsule 9 and initiates the operation of the gas capsule to release a high velocity stream of gas under pressure into the piston cylinder 1.

Fig. 3 is a perspective presentation of a parachute, descending with a load of freight, utilizing a plurality of new and improved parachute deceleration devices of the present invention.

The parachute canopy 29, in decending, supports the parachute shroud lines 30. The straps 31 connect the bases of the piston cylinders of the parachute deceleration devices 32, 33 and 34 to the shroud lines 30 of the parachute. The straps 35 connect the piston shafts of the parachute deceleration devices 32, 33 and 34 and the freight 42.

The freight 42 is secured for its descent with the parachute by cross-strapping or cross-binding. The straps 35 are so arranged in supporting the freight 42 that each of the parachute deceleration devices 32, 33 and 34 may support the freight in stabilized position without the aid of the other two deceleration devices. The shroud lines 30 are so arranged in supporting the parachute deceleration devices 32, 33 and 34 that each of the parachute deceleration devices 32, 33 and 34 may be supported by the parachute canopy 29 in stabilized position without the aid of the shroud lines supporting the other two deceleration devices.

Although three parachute deceleration devices 32, 33 and 34 are shown in Fig. 3, any number of parachute deceleration devices, within practical limitations, may be utilized in the practice of the present invention. The parachute deceleration devices utilized, however, should be so supported by the shroud lines 30 of the parachute that each of the parachute deceleration devices utilized is supported by the parachute canopy 29 in stabilized position without the aid of the shroud lines supporting the other deceleration devices utilized. The parachute deceleration devices utilized should also have their piston shaft supporting straps 35 so arranged in supporting the freight 42 that each of the parachute deceleration devices may support the freight in stabilized position without the aid of the other deceleration devices utilized.

As is obvious, a man may descend in place of the freight indicated in Fig. 3. As is also obvious, a man, or freight, may descend with a parachute utilizing only one parachute deceleration device rather than the plurality thereof shown in Fig. 3.

The cords 36, 37 and 38 support the weights 39, 40 and 41 respectively. The cords 36, 37 and 38 may be so selected in length that the weights 39, 40 and 41 reach the earth, or objects on the earth, at different heights of the parachute and its freight above the earth. The weights 39, 40 and 41 may be of any type, as long as they are sufficiently heavy to apply a force to the arm 12 of the triggering mechanism greater than that applied to the arm 12 by the spring 11.

The operation of the plurality of parachute deceleration devices of Fig. 3 is as follows.

In their inoperative condition the component parts of the parachute deceleration devices 32, 33 and 34 are in the positions shown in Fig. 3. The component parts maintain the positions shown in Fig. 3 during the descent of the parachute and its load 42.

The length of each cord 36, 37 and 38 is predetermined to insure that the weight 39, 40 and 41 respectively supported by each cord will reach the earth at a predetermined time before the load reaches the earth. When the weight 40, supported by the cord 37, reaches the earth, or an object on the earth, the previously weighted taut cord becomes slack and removes the force, previously applied by the weight 40, from the eye portion of the arm of the triggering mechanism (shown in Fig. 1) of the parachute deceleration device 33. The triggering mechanism operates, as described in connection with Fig. 1, to force the piston shaft upward into the cylinder of the parachute deceleration device 33. This pulls the entire load 42, which is supported by the parachute deceleration device 33 through the straps 35, upward, closer to the canopy 29 of the parachute and pulls the canopy of the parachute, downward, closer to the load, in the manner described in connection with Fig. 1. The resultant effect is a slowing down of the rate of descent of the load 42 to earth.

When the weight 39, supported by the cord 36, reaches the earth, or an object on the earth, the previously weighed taut cord becomes slack and removes the force, previously applied by the weight 39, from the eye portion of the arm of the triggering mechanism (shown in Fig. 1) of the parachute deceleration device 32. The resultant operation and effect is the same as that produced by the parachute deceleration devices 33 and 32.

When the weight 41, supported by the cord 38, reaches the earth, or an object on the earth, the previously weighted taut cord becomes slack and removes the force, previously applied by the weight 41, from the eye portion of the arm of the triggering mechanism (shown in Fig. 1) of the parachute deceleration device 34. The resultant operation and effect is the same as that produced by the parachute deceleration devices 33 and 32.

The system of Fig. 3 operates to cushion the impact of landing of the load in a series of steps which consist of slowing the rate of descent of the load. Any number of the parachute deceleration devices of the present invention may be utilized in a single system. The rate of descent of the freight will be slowed down as many times as there are parachute deceleration devices utilized. Thus, the greater the number of parachute deceleration devices utilized, the greater will be the cushioning effect on the landing impact to the freight.

The cords are preferably staggered in length, as shown in Fig. 3, to provide for a series of "cushionings" to ease the freight down to the ground.

Obviously many modifications and variations of the present invention are possible in the light of the above teachings. It is therefore to be understood that within the scope of the appended claims the invention may be practiced otherwise than as specifically described.

I claim:

1. In a parachute deceleration device the combination of energy converting means with triggering means for said enery converting means and coupling means for said energy converting means, said energy converting means being adapted for converting gas pressure to lateral motion and comprising a closed piston cylinder, a piston shaft having a piston head coaxially affixed thereto and extending through the base of said cylinder, an upper bushing and a lower bushing adapted to permit axial motion of said shaft, said upper bushing being supported by said base of said cylinder and said lower bushing being supported by a lower bushing support unit extending axially from said base of said cylinder, ventilating holes in said cylinder in the area farthest from said base, a piston head spacer coaxially positioned on said shaft on the underside of said piston head, a hole through said cylinder in the area between said base and said underside of said piston head having a diameter smaller than the axial length of said spacer and a high velocity gas capsule fitted in said hole and having its output end positioned to release gas into said cylinder, said triggering means being adapted for initiating the operation of said gas capsule to release gas under pressure into said cylinder and comprising a housing, a triggering mechanism in said gas capsule adapted to operate said gas capsule upon contact, an arm pivotally affixed to said housing by a pivot, a contact point at one end of said arm, a spring affixed at one end to said housing and at the other end to said arm between said contact point and said pivot, said spring being adapted to urge said contact point into engagement with said triggering mechanism, an eye in said arm at the end opposite that supporting said contact point, a cord secured at one end to said arm through said eye and passing through a hole through said housing and a weight secured to the other end of said cord, said weight being adapted to urge said contact point away from engagement with said triggering mechanism, said coupling means being adapted for coupling said energy converting means to outside equipment and comprising a base plate affixed to the flat surface of said closed piston cylinder farthest from said base and another base plate affixed to the outer extremity of said shaft, coupling screws extending perpendicularly from said base plates, clamp plates having holes therethrough positioned to interact with said coupling screws, said clamp plates being adapted for insertion through loops in straps from outside equipment and bolts cooperating with said coupling screws to bolt said clamp plates to said base plates.

2. In a parachute deceleration device the combination of energy converting means as described in claim 1 with coupling means for said energy converting means as described in claim 1 and triggering means for said energy converting means, said triggering means being adapted for initiating the operation of said gas capsule to release gas under pressure into said cylinder and comprising a housing, a triggering mechanism in said gas capsule adapted to operate said gas capsule upon electrical energization, an arm pivotally affixed to said housing by a pivot, an electrical contact point insulatedly affixed to one end of said arm and electrically connected through a battery to a terminal of said triggering mechanism, an electrical contact point insulatedly affixed to said housing and electrically connected to the other terminal of said triggering mechanism, a spring affixed to one end to said housing and at the other end to said arm between said contact point and said pivot, said spring being adapted to urge said electrical contact points into engagement with each other, an eye in said arm at the end opposite that supporting said contact point, a cord secured at one end to said arm through said eye and passing through a hole through said housing and a weight secured to the other end of said cord, said weight being adapted to urge said contact points out of engagement with each other.

3. In a parachute deceleration device the combination of energy converting means with triggering means for said energy converting means and coupling means for said energy converting means, said energy converting means being adapted for converting gas pressure to mechanical motion and comprising a closed piston cylinder, a piston shaft having a piston head coaxially affixed thereto and extending through the base of said cylinder, said piston shaft being adapted for axial motion in said cylinder, a hole through said cylinder in the area between said base and said piston head and a high velocity gas capsule fitted in said hole and adapted to release gas into said cylinder, said triggering means being adapted for initiating the operation of said gas capsule to release gas under pressure into said cylinder and comprising a housing, a triggering mechanism in said gas capsule adapted to initiate said gas release upon contact, an arm pivotally affixed to said housing, means urging one end of said arm into engagement with said triggering mechanism, a cord secured at one end to the opposite end of said arm and passing through a hole through said housing and a weight secured to the other end of said cord, said weight being adapted to urge said arm away from engagement with said triggering mechanism, said coupling means being adapted for coupling said energy converting means to outside equipment and comprising a base plate affixed to the closed end of said piston cylinder and another base plate affixed to the outer extremity of said shaft, clamp plates adapted for insertion through loops in straps connected to outside equipment and means for bolting said clamp plates to said base plates.

4. In a parachute deceleration device the combination of energy converting means as described in claim 3 with coupling means for said energy converting means as described in claim 3 and triggering means for said energy converting means, said triggering means being adapted for initiating the operation of said gas capsule to release gas under pressure into said cylinder and comprising a housing, a triggering mechanism in said gas capsule adapted to initiate said gas release upon electrical energization, an arm pivotally affixed to said housing, an electrical contact point insulatedly affixed to one end of said arm and electrically connected through a battery to a terminal of said triggering mechanism, an electrical contact point insulatedly affixed to said housing and electrically connected to the other terminal of said triggering mechanism, means urging said contact points into engagement with each other, a cord secured at one end to the opposite end of said arm and passing through a hole through said housing and a weight secured to the other end of said cord, said weight being adapted to urge said contact points out of engagement with each other.

5. In a parachute deceleration device the combination of energy converting means as described in claim 4 with coupling means as described in claim 4 and triggering means comprising a housing, means for initiating the conversion of said compressed gas pressure to said mechanical motion of said shaft upon electrical energization, an arm pivotally affixed to said housing, an electrical contact point insulatedly affixed to one end of said arm and electrically connected through a battery to a terminal of said initiating means, an electrical contact point insulatedly affixed to said housing and electrically connected to the other terminal of said initiating means, means urging said contact points into engagement with each other and means applying the force of a weight to the opposite end of said arm for urging said contact points out of engagement with each other.

6. An improved deceleration device for a parachuted load comprising, a cylinder, a piston in said cylinder, coupling means secured to one end of said cylinder, said one end of said cylinder being formed with at least one opening to permit free communication between ambient atmosphere and the atmosphere included in said cylinder between said piston and said one end of said cylinder, a piston rod secured to said piston and extending beyond the other end of said cylinder, coupling means secured to the end of said piston rod remote from said piston, guide means for said piston rod secured to said other end of said cylinder, a high pressure gas container including gas release triggering means secured to said other end of said cylinder and projecting into the interior of said cylinder, said cylinder, piston, piston rod, bushing and container being closely fitted so as to provide a relatively gas tight space between said piston and said other end of said cylinder, biased means secured to said cylinder and adapted for actuating said gas release triggering means to permit high pressure gas to escape from said container into said other end of said cylinder, a cord and weight coupled to said biased means to prevent said biased means from actuating said gas release triggering means as long as said cord and weight depend freely from said deceleration device, said coupling means being adapted to couple said deceleration device between a parachute and a load.

References Cited in the file of this patent

UNITED STATES PATENTS

| | | |
|---|---|---|
| 2,414,284 | Bacon | Jan. 14, 1947 |
| 2,486,403 | Hattan | Nov. 1, 1949 |
| 2,492,501 | Robins | Dec. 27, 1949 |
| 2,560,445 | Jackson | July 10, 1951 |
| 2,587,448 | Eakin | Feb. 26, 1952 |

FOREIGN PATENTS

| | | |
|---|---|---|
| 615,054 | Great Britain | Dec. 31, 1948 |